United States Patent
Ikeda (10) Patent No.: US 6,594,038 B1
(45) Date of Patent: Jul. 15, 2003

(54) IMAGE READING APPARATUS AND PROCESSING METHOD OF AN IMAGE SIGNAL

(75) Inventor: Hidetoshi Ikeda, Fukuoka (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/262,642

(22) Filed: Mar. 4, 1999

(30) Foreign Application Priority Data

Mar. 5, 1998 (JP) .............................. 10-53231

(51) Int. Cl.⁷ ................................. H04N 1/04
(52) U.S. Cl. ...................... 358/486; 358/474; 358/475
(58) Field of Search ................ 358/468, 486, 358/474, 475, 494, 496, 497

(56) References Cited

U.S. PATENT DOCUMENTS

| 5,150,227 A | | 9/1992 | Koshiyouji et al. | ......... 358/497 |
|---|---|---|---|---|
| 5,221,976 A | | 6/1993 | Dash et al. | ................. 358/486 |
| 5,239,392 A | * | 8/1993 | Suzuki | ........................ 358/474 |
| 5,721,626 A | | 2/1998 | Kimura | ...................... 358/482 |
| 5,751,444 A | * | 5/1998 | Ward | ............................ 358/471 |
| 6,111,666 A | * | 8/2000 | Yoshinaga | .................. 358/474 |

FOREIGN PATENT DOCUMENTS

| EP | 0 399 651 A | | 11/1990 | ............ H04N/1/04 |
|---|---|---|---|---|
| EP | 0 515 088 A1 | | 11/1992 | ............ H04N/1/04 |
| EP | 0409875 B1 | * | 6/1995 | ............ G01B/11/26 |

* cited by examiner

*Primary Examiner*—Jerome Grant, II
(74) *Attorney, Agent, or Firm*—Rossi & Associates (57) ABSTRACT

The image reading apparatus of the invention has a function of changing over between ordinary image reading mode and fine reading mode, and in the fine reading mode, the moving speed of the carriage moving the photoelectric converter is set to 1/n of the ordinary reading mode, and the number of times of incorporating the signal data being read out from the photoelectric converter into the image processing circuit is set to 1/n of the ordinary reading mode, so that lowering of resolution in the carriage moving direction is prevented. The image reading apparatus of the invention allows the user to select and change over freely the ordinary image reading mode and fine reading mode, and allows the value of n to be selected freely depending on the resolution of the desired image.

2 Claims, 12 Drawing Sheets

FIG. 2A

CCD sampling timing

FIG. 2B

CCD reading data between t~t+δt

FIG. 3A

CCD sampling timing

FIG. 3B

CCD reading data between t–t+δt

FIG. 5A
CCD sampling timing

FIG. 5B
CCD output

CCD reading data between t~t+1/4δt

Lighting timing (illuminate 1/4 duration)

FIG. 8B

CCD sampling timing

FIG. 8C

CCD output data

CCD reading data between $t \sim t+\delta t$

Original image

FIG. 12B

Scanned image

IMAGE READING APPARATUS AND PROCESSING METHOD OF AN IMAGE SIGNAL

FIELD OF THE INVENTION

The present invention relates to an image reading apparatus for reading an image on an original document, for use in facsimile equipment, a digital copier, a scanner or the like.

BACKGROUND OF THE INVENTION

Recent advancements in computerized work stations and personal computers have led to devices that can perform advanced processing functions including image editing, electronic filing and character input by OCR at high speeds. In order to provide digitized images to the work stations and personal computers, image scanners capable of easily entering original images at high resolutions and increased speeds are increasing being required to match the trend in workstation and personal computer advances.

Figure 10:
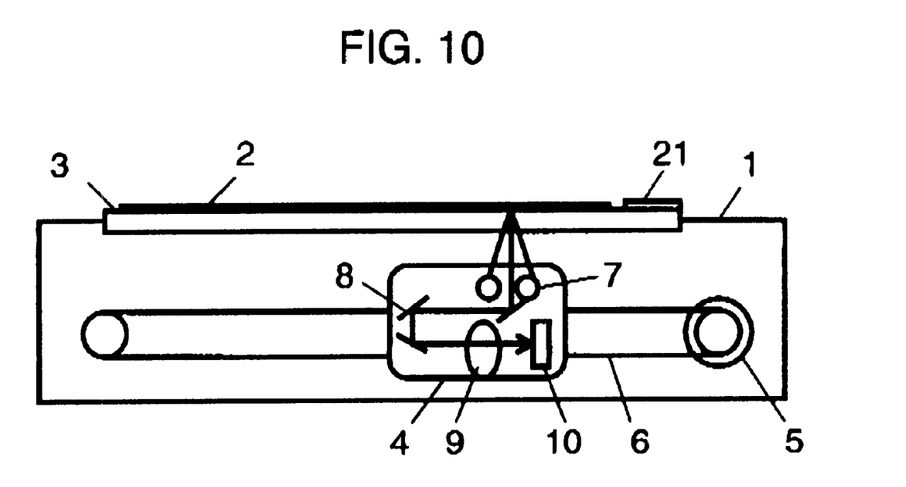
FIG. 10 is a schematic construction of a conventional image reading apparatus.

A schematic structure of a conventional image scanning or reading apparatus is shown in FIG. 10. In FIG. 10, reference numeral 1 is an image reading apparatus, 2 is an original document, 3 is a glass platen, 4 is a carriage, 5 is a drive motor, 6 is a drive wire, 7 is a light source, 8 is a reflector, 9 is a lens, and 10 is a CCD line sensor.

In the conventional image reading apparatus shown in FIG. 10, two scanning directions are used when reading the image, that is, a main scanning direction of scanning in the pixel line direction of the CCD line sensor 10, and a subsidiary scanning direction along the movement of the carriage 4.

Figure 11:
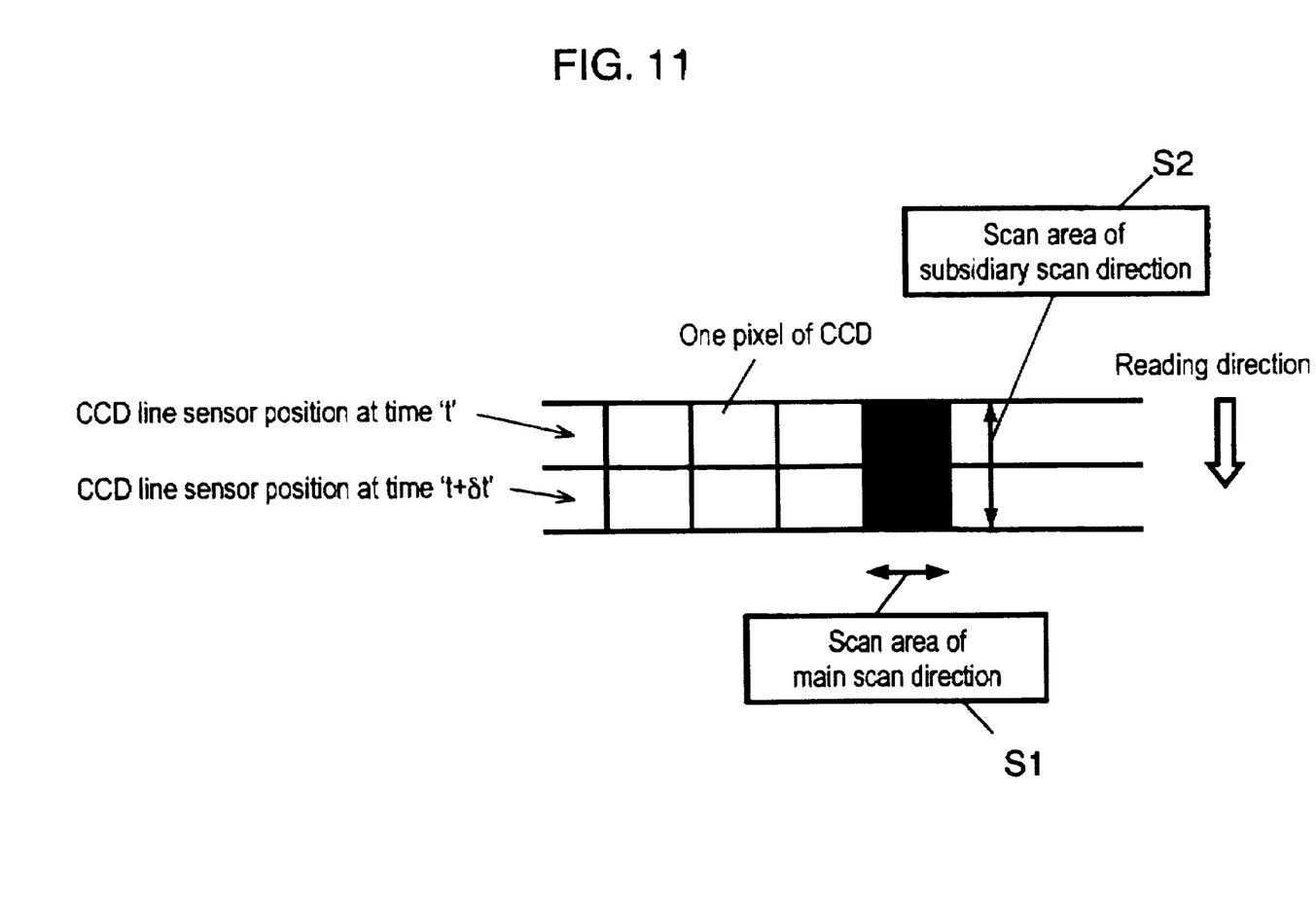
FIG. 11 is an explanatory diagram of reading operation in subsidiary scanning direction in a prior art.

When the CCD line sensor 10 reads the document 2 during an image reading operation, a reading trace as shown in FIG. 11 is generated. The reading trace in the main scanning direction is only the portion of one pixel of the CCD line sensor 10 shown in the scan area S1 at the main scanning side in FIG. 11.

In contrast, the reading trace S2 in the subsidiary scanning direction is a range of two rows of the CCD line sensor 10 owing to the accumulation time of the CCD line sensor 10. As a result, the signal data of the CCD line sensor 10 entered in the processing circuit becomes the average of the signals from two rows of the sensor.

Figure 12A:
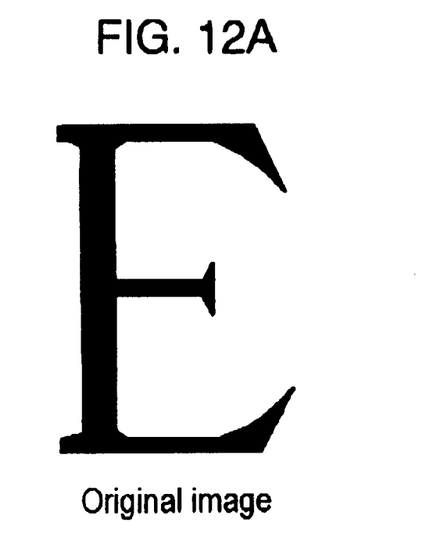
FIG. 12A is an image diagram showing an original image.
Figure 12B:
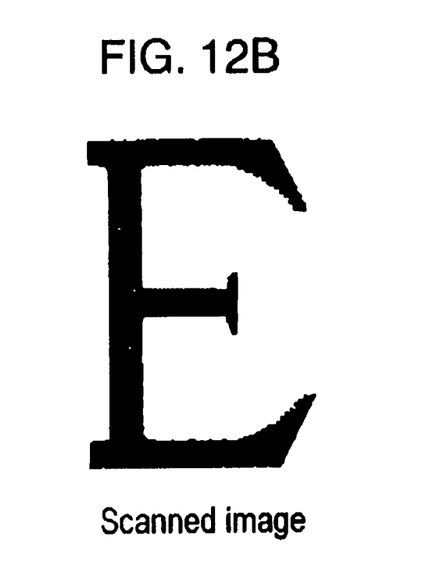
FIG. 12B is an image diagram showing a scan image of the image being read out by a conventional image reading apparatus.

Accordingly, when the original image shown in FIG. 12A is read by the conventional method, the resolution deteriorates in the subsidiary scanning direction, and the image is blurry, as shown in FIG. 12B. Such image blurring is called the move average effect. Thus, in the image reading process of the conventional image reading apparatus, there are problems of lowering of resolution in the subsidiary scanning direction.

It is hence the objects of the present invention to provide an image reading apparatus capable of decreasing the move average effect in the subsidiary scanning direction and preventing lowering of resolution in the subsidiary scanning direction, and to provide a processing method of image signal.

SUMMARY OF THE INVENTION

To solve the above problems, the image reading apparatus of the invention comprises a) a light source for illuminating an original document,
b) an optical system for focusing a reflected light or transmitted light from the original document,
c) a carriage capable of moving at least the light source relatively to the original document in the subsidiary scanning direction,
d) a photoelectric converter of a line form for converting the focused original image into an electric signal in every pixel for one line,
e) and an electric circuit for controlling the entire apparatus.

The operation of the image reading apparatus can be changed between an ordinary image reading mode and a subsidiary scanning fine reading mode according to the selection of the users of the apparatus. In the ordinary image reading mode, the moving speed of the movable carriage predetermined for the resolution in the subsidiary scanning direction is determined by a central processing unit. And, also, in the subsidiary scanning fine reading mode, the moving speed of the movable carriage can be set to 1/n of the moving speed of the carriage in the ordinary image reading mode according to the selection of the users of the apparatus. In this case the reading signal data from the photoelectric converter of a line form is taken into the signal processing circuit in every 1/n times of the number of times of incorporating the signal data in the ordinary image reading mode.

In another feature of the invention, the user of the image reading apparatus of the present invention is capable of setting the value of above-mentioned n arbitrarily. By controlling the value of n, the user can control the degree of fineness they need, and hence are capable of preventing deterioration of resolution in the subsidiary scanning direction by increasing the value of n.

According to the constitution of the present invention, in an image input into the image reading apparatus, the lowering of resolution in the subsidiary scanning direction can be prevented by decreasing the move average effect in the subsidiary scanning direction.

DESCRIPTION OF THE PREFERRED EMBODIMENTS

Preferred embodiments of the invention are described below while referring to FIG. 1 to FIG. 9.

First Exemplary Embodiment

The mechanical and optical constitution of the image reading apparatus according to a first embodiment of the invention is same as the conventional constitution shown in FIG. 10.

Figure 1:
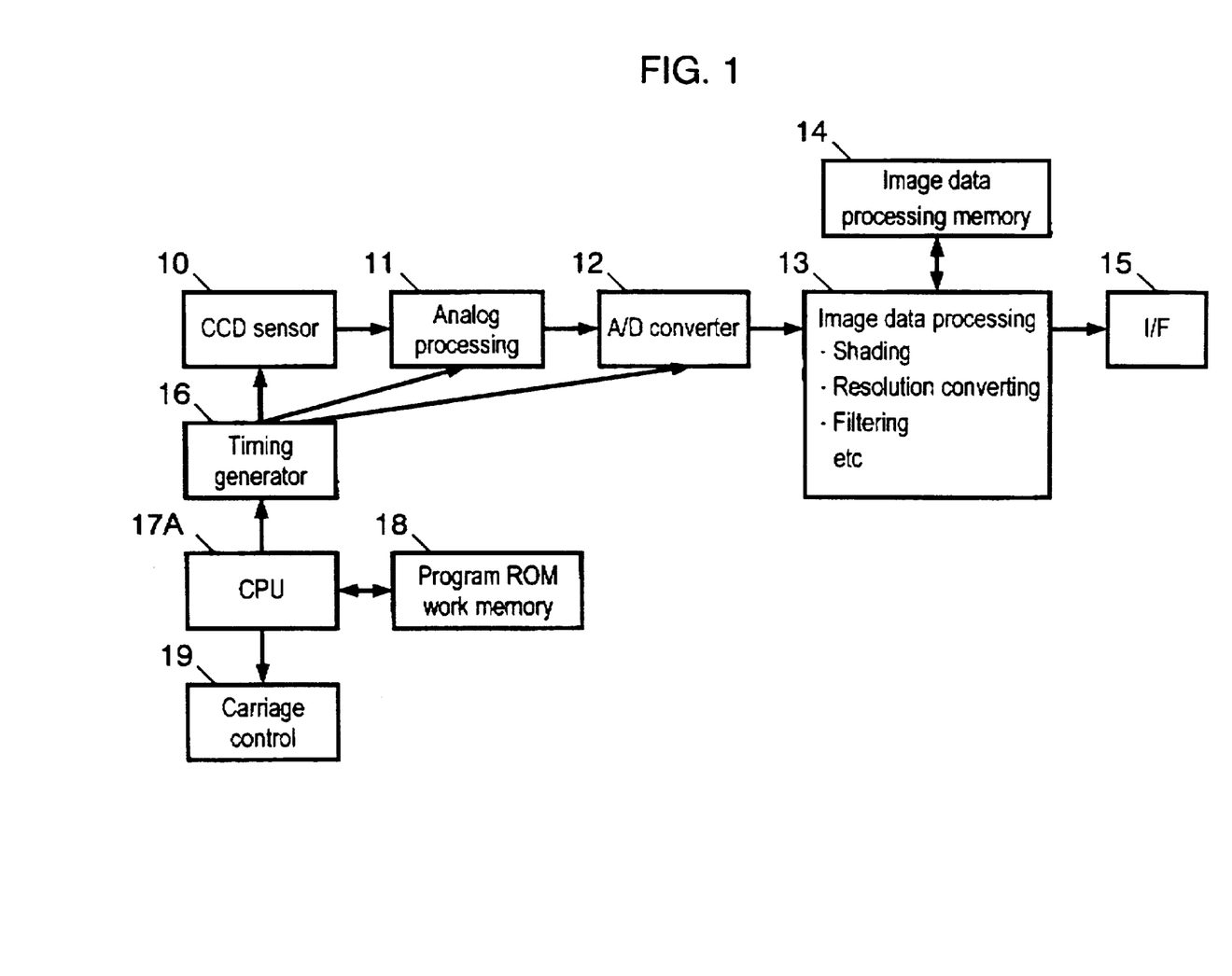
FIG. 1 is a block diagram showing an electric system of an image reading apparatus in embodiment 1 of the invention.

FIG. 1 is a block diagram showing an electric system of the image reading apparatus of the embodiment. In FIG. 1, an analog processing circuit 11 is provided for amplifying and holding the image signal obtained from a CCD line sensor 10. An A/D converter 12 converts the output of the analog processing circuit 11 into a digital image signal that is supplied to an image processing circuit for shading correction, filter correction, magnifying or reduction of the image signal. An image processing memory 14 is provided for temporarily storing the image data when processing the image data. An interface 15 is coupled to the image processing circuit 13 for exchanging data with external devices. A timing generator 16 controls the operation of the CCD line sensor 10, A/D converter 11 and image processing circuit 13. A control circuit or central processing unit (CPU) is provided for controlling the entire apparatus. A memory 18 is used to store a control program of the CPU 17 and to act as a working memory for the CPU 17. In the illustrated embodiment, a carriage drive controller 19 receives control signals from the CPU 17 to drive the carriage. It will be understood, however, that the CCD line sensor 10 can be maintained in a stationary position and the original document can be moved.

Figure 2A:
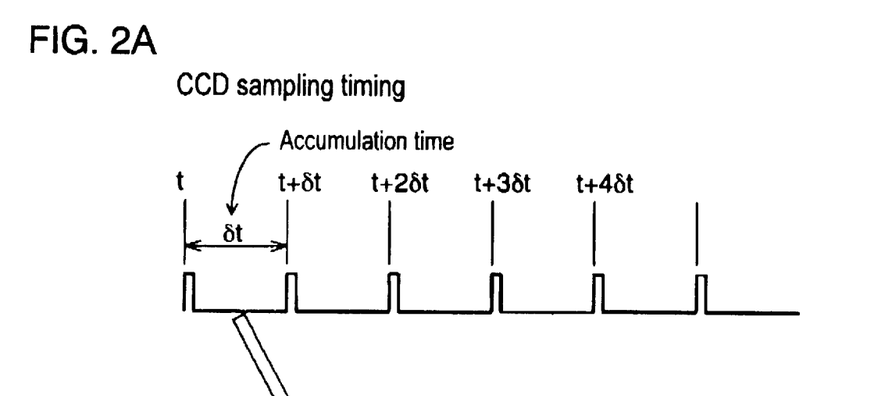
FIG. 2A is a timing chart showing the operation of CCD line sensor in ordinary reading mode.

In thus constituted image reading apparatus, the operation is described below while referring to FIG. 2 to FIG. 4. FIGS. 2A and B are timing charts showing the operation and output data of the CCD line sensor 10 in the ordinary reading mode. FIGS. 3A and B are timing charts showing the operation and output data of the CCD line sensor 10 in the subsidiary scanning fine reading mode, and FIG. 4 is an explanatory diagram of reading operation in the subsidiary scanning direction. Explained below is a case of operating at resolution of 600 dpi in subsidiary scanning direction.

The moving speed of the carriage 19 is set by the CPU 17 according to the resolution in the subsidiary scanning direction to a predetermined value. For example, supposing the reading resolution is to be 600 dpi and the accumulation time of the CCD line sensor 10 (corresponding to the shutter time) is 8 ms, the moving speed of the carriage is set to be 5.25 mm/s.

Figure 2B:
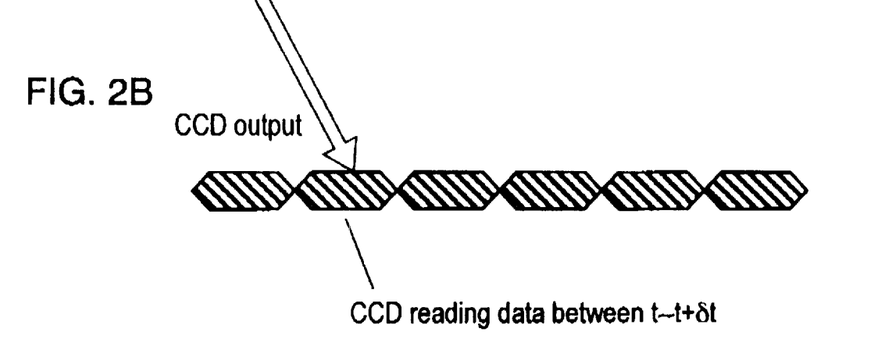
FIG. 2B is a timing chart showing the output data of CCD line sensor in ordinary reading mode.
Figure 3A:
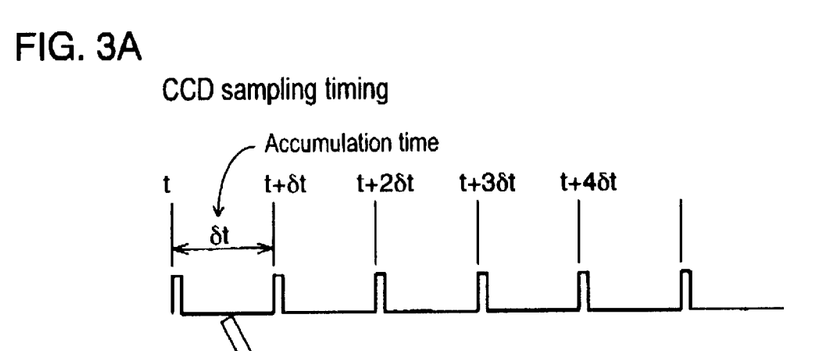
FIG. 3A is a timing chart showing the operation of CCD line sensor in subsidiary scanning fine reading mode.

First, FIG. 2 shows the timing of output signal in the ordinary reading mode. In the case of the accumulation time of the CCD line sensor 10 to be generalized to $\Box t$, the signals being read in the interval of $t+\Box t$ from t at the sampling timing of the CCD line sensor 10 are delivered by delay of one line as shown by the waveform of the CCD line sensor output data in FIG. 2B. This operation is the same as in the case of the conventional image reading apparatus.

Figure 3B:
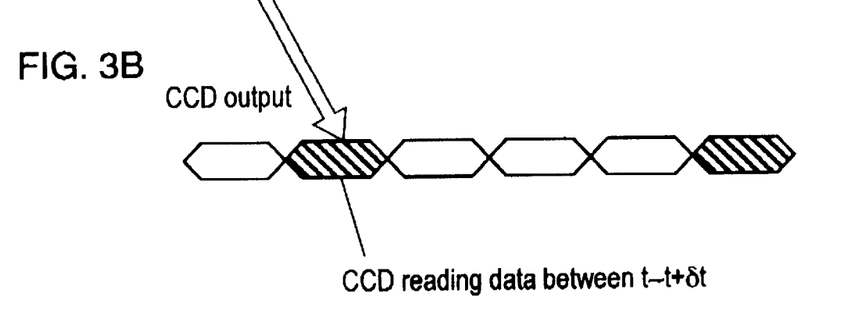
FIG. 3B is a timing chart showing the output data of CCD line sensor in subsidiary scanning fine reading mode.
Figure 4:
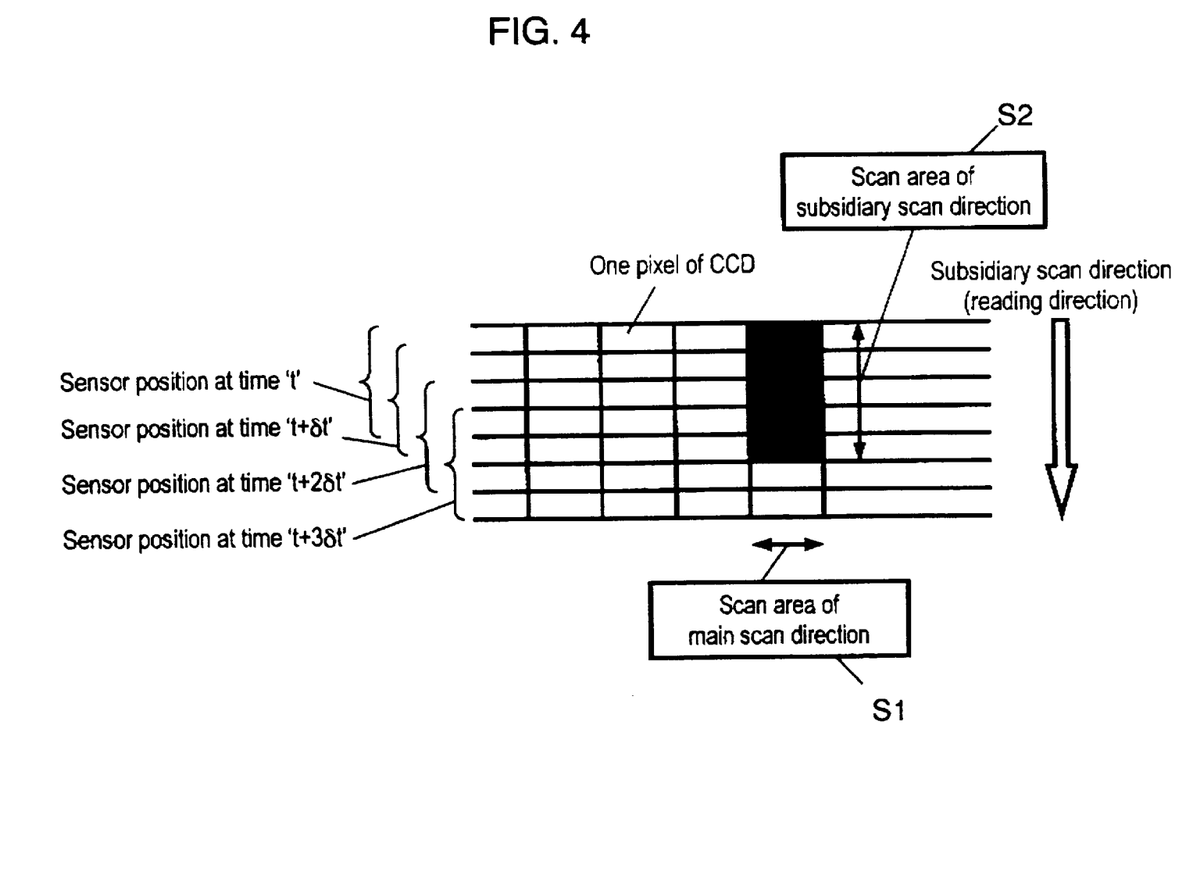
FIG. 4 is an explanatory diagram of reading operation in subsidiary scanning direction.

On the other hand, in the subsidiary scanning fine reading mode of the present embodiment, shown in FIG. 3, the accumulation time of the CCD line sensor 10 is the same with the conventional image reading process. But the output data of the CCD line sensor 10 is delivered for the portion of only one line out of the output data of four lines. Herein, the meaning of delivering output data of the portion of only one line out of the output data of four lines is that only the output data is not used, not that the transfer clock is stopped while the output data of the CCD line sensor 10 is made.

FIG. 4 shows the reading traces of the CCD line sensor 10 in a reading operation on the original document 2 in the action as shown in FIG. 3. The reading trace in the main scanning direction corresponds to the width of one pixel of the CCD line sensor 10 as shown in scan area S1 in FIG. 4. By contrast, the reading trace in the subsidiary scanning direction is the trace of move of the carriage 4 in the period of accumulation time $\Box t$ as shown in scan area S2 at the subsidiary scanning direction in FIG. 4. As known from FIG. 4, the move averaging of the image data occurs also in subsidiary scanning of the present embodiment. But, the amount of output data responsible for move averaging is small as compared with the prior art, that is, only the portion of ¼ pixel, and deterioration of resolution can therefore be decreased.

However, when the image data is processed in the subsidiary scanning fine reading mode of this embodiment, the transfer speed of the reading image data is lowered. Accordingly, by supplying a user command signal to the CPU 17, the CPU 17 can select either the ordinary reading mode or the subsidiary scanning fine reading mode. The user can select the two reading modes depending on the intended use.

In this explanation, the output data of the CCD line sensor 10 is delivered once in every four times, and the moving speed of the carriage 4 is set to ¼ of the ordinary reading mode, but generally by delivering the output data once in every n times to set the moving speed to 1/n of the ordinary mode, the resolution of the image reading may be enhanced. In this case, of course, the larger the value of n, the higher is the resolution.

However, the image transfer speed becomes slower in proportion to the value of n. Accordingly, by constituting the image reading apparatus so that the value of n can be freely set by the user depending on the desired resolution, the subsidiary scanning resolution and transfer speed can be selected according to the purpose of use of the user.

As is clear from the description herein, by using the image reading apparatus of the embodiment, the user can select the ordinary reading mode and subsidiary scanning fine reading mode, and when the subsidiary scanning fine reading mode is selected, the subsidiary scanning resolution and transfer speed can be selected depending on the purpose of use of the user.

Second Exemplary Embodiment

The image reading apparatus according to the second embodiment of the invention is similar to the image reading apparatus of the first embodiment, except that the timing generator 16 also has, in addition to the function described in the first embodiment, a function of freely setting the interval of accumulation time of the CCD line sensor 10 and the transfer clock frequency.

Figure 5A:
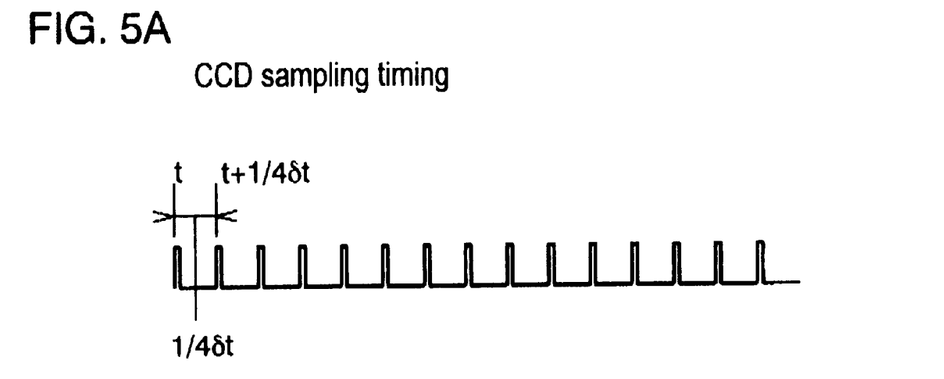
FIG. 5A is a timing chart showing the operation of CCD line sensor in subsidiary scanning fine reading mode.
Figure 5B:
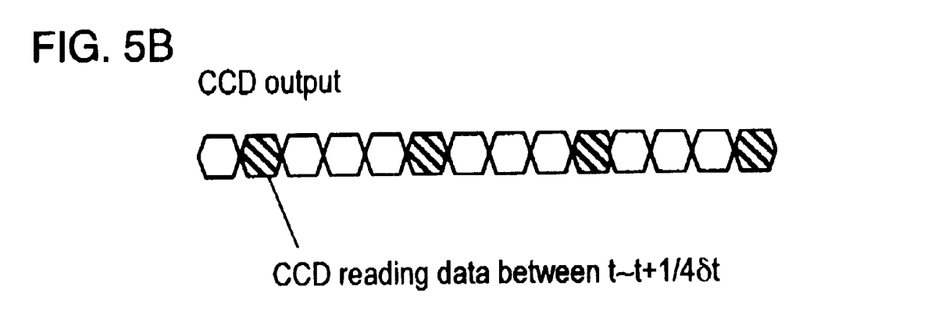
FIG. 5B is a timing chart showing the output data of CCD line sensor in subsidiary scanning fine reading mode.
Figure 6:
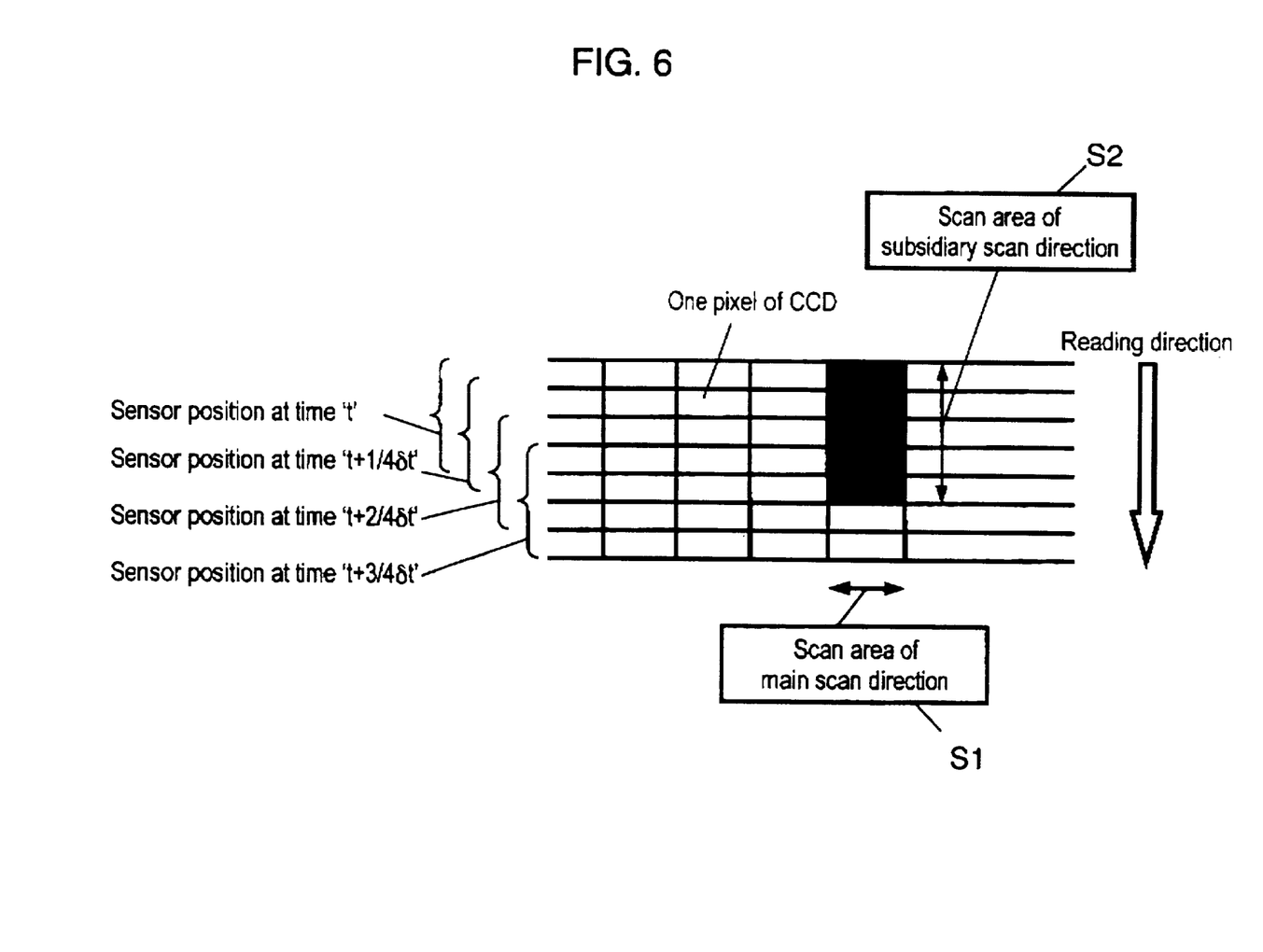
FIG. 6 is an explanatory diagram of reading operation in subsidiary scanning direction.

In thus constituted image reading apparatus, the operation is described while referring to FIG. 5 and FIG. 6. The operation in the ordinary reading mode is same as in the first embodiment and hence its explanation is omitted.

In the subsidiary scanning fine reading mode in the second embodiment of the invention, the accumulation time of the CCD line sensor 10 is ¼ of the ordinary reading mode as shown in FIG. 5A, and the transfer clock frequency is the frequency of four times in the ordinary reading mode. Accordingly, as shown in FIG. 5B, the output of the CCD line sensor 10 is delivered only once in every four times. However, although not shown in FIG. 5, in this embodiment, the moving speed of the carriage 4 in the subsidiary scanning fine reading mode is same as in the ordinary reading mode.

Reading traces of the CCD line sensor 10 in this embodiment are shown in FIG. 6. The reading trace in the main scanning direction corresponds to the width of one pixel of the CCD line sensor 10 as shown in scan area S1 at the main scanning side in FIG. 6, same as in the first embodiment.

On the other hand, the reading trace in the subsidiary scanning direction is the trace of movement of the carriage 4 in the period of accumulation time ¼□t as shown in scan area S2 at the subsidiary scanning side in FIG. 6. In this case, too, the move averaging of the image also occurs due to move of the carriage 4, but the effect is only the portion of ¼ pixel as compared with the move averaging by the conventional reading method.

Therefore, by the subsidiary scanning fine reading mode of the embodiment by setting the accumulation time of the CCD line sensor 10 to ¼ of the ordinary reading mode and the transfer clock frequency to the frequency of four times of the ordinary reading mode, deterioration of resolution in the subsidiary scanning direction can be curtailed. However, in the embodiment, since the accumulation time of the CCD line sensor is shorter, it is predicted that the S/N of the output signal of the CCD line sensor may be lowered. Accordingly, by specifying when it is designed to select either the ordinary reading mode or the subsidiary scanning fine reading mode as shown in FIG. 5, the user can select either the mode for putting emphasis on the S/N, or the mode for putting emphasis on the resolution in the subsidiary scanning direction.

In the example explained above, the accumulation time of the CCD line sensor 10 is ¼, the transfer clock frequency is 4 times, and the output signal from the CCD line sensor 10 is delivered once in every four times, but generally when the accumulation time of the CCD line sensor 10 is 1/n, the transfer clock frequency is n times, and the output signal from the CCD line sensor 10 is delivered once in every n times, as the value of n is larger, the resolution in the subsidiary scanning direction is improved. On the other hand, as the value of n is larger, the S/N of the output signal from the CCD line sensor 10 is lowered. In the image reading apparatus of the embodiment, since the user can freely set the value of n, the user can select, depending on the purpose of use, the subsidiary scanning resolution and the S/N of the output signal from the CCD line sensor 10, that is, the gradation of the image.

As is clear from the description herein, by using the image reading apparatus of the embodiment, the user can select the ordinary reading mode and subsidiary scanning fine reading mode, and further when the subsidiary scanning fine reading mode is selected, the subsidiary scanning resolution and image gradation can be selected depending on the purpose of use of the user.

Third Exemplary Embodiment

Figure 7:
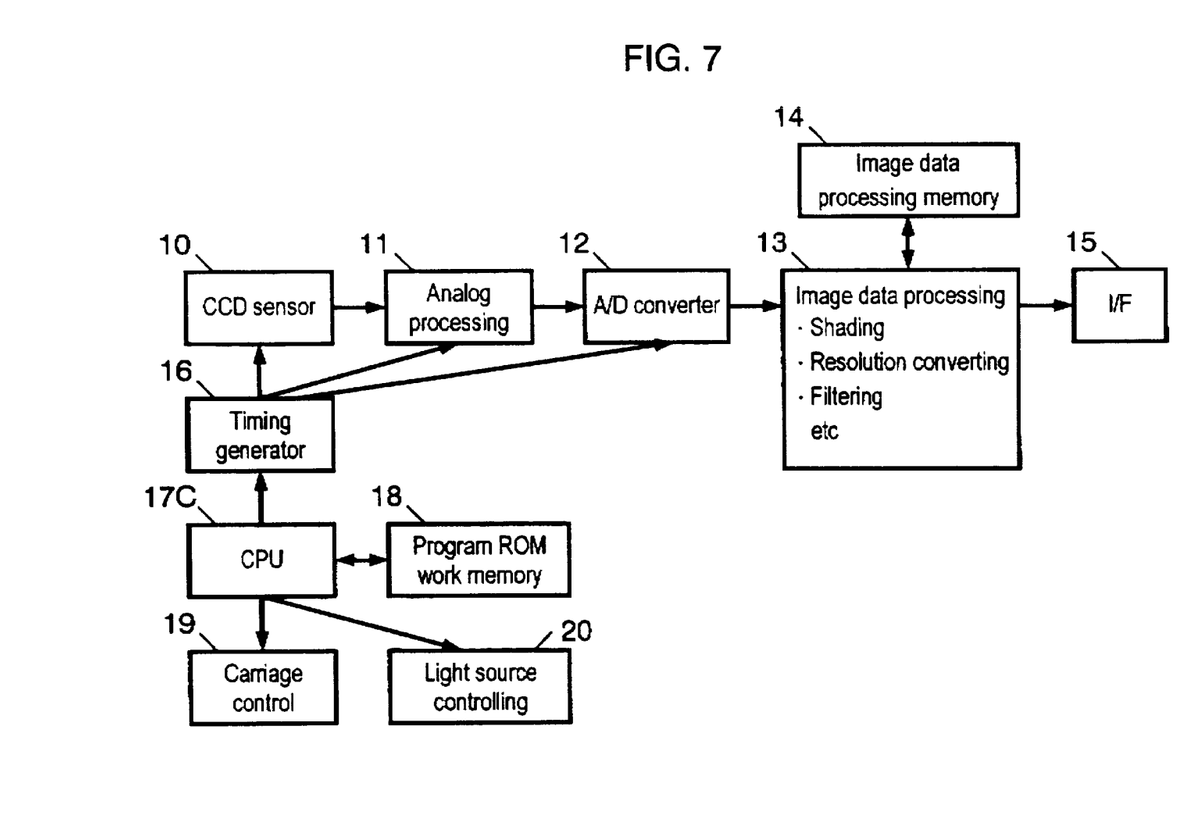
FIG. 7 is a block diagram showing an electric system of an image reading apparatus in embodiment 3 of the invention.

The image reading apparatus of the third embodiment of the invention is similar to the image reading apparatus of the first embodiment, except that it further includes a light source quantity controller 20 for adjusting the quantity of light of the light source lamp by the command from the central processing unit as shown in FIG. 7. In thus constituted image reading apparatus, the operation is described below while referring to FIG. 8 and FIG. 9. The operation in the ordinary reading mode is same as in the first embodiment and hence its explanation is omitted.

Figure 8A:
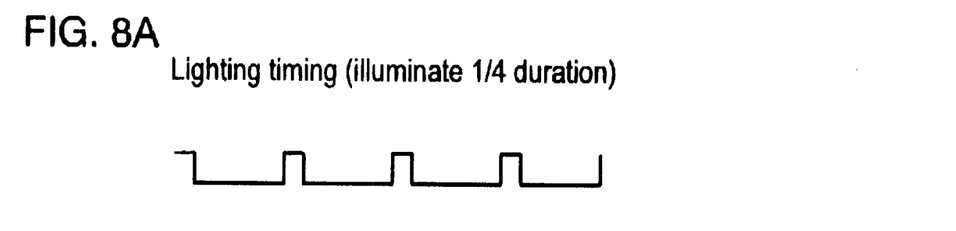
FIG. 8A is a timing chart showing the control of light source in subsidiary scanning fine reading mode.
Figure 8B:
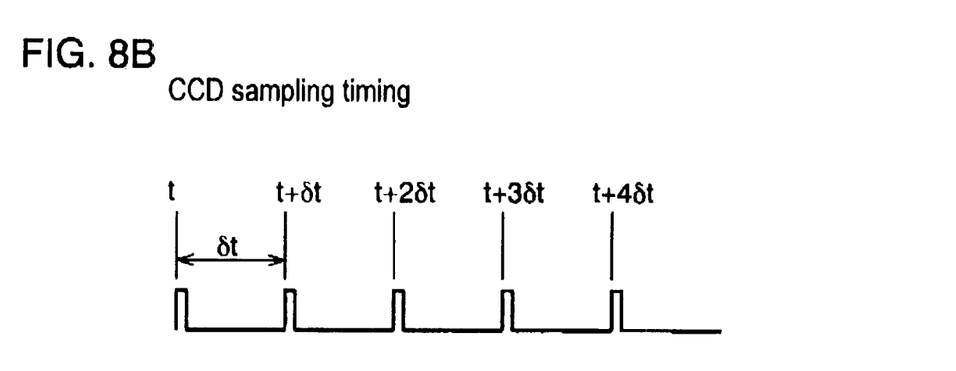
FIG. 8B is a timing chart showing the operation of CCD line sensor in subsidiary scanning fine reading mode.
Figure 8C:
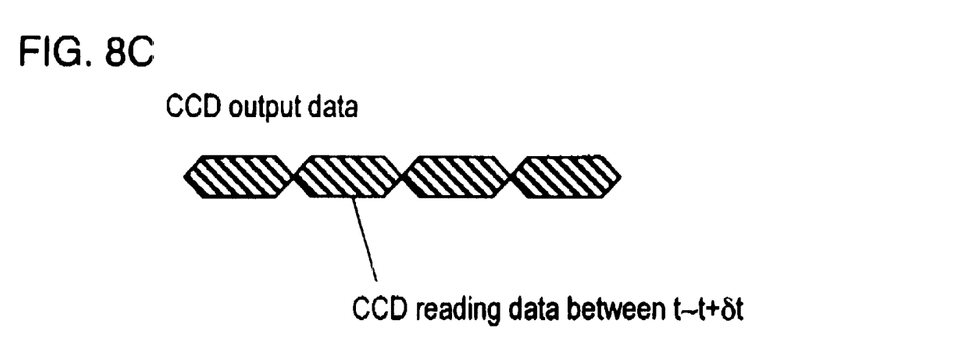
FIG. 8C is a timing chart showing the output data of CCD line sensor in subsidiary scanning fine reading mode.

In the subsidiary scanning fine reading mode of the image reading apparatus in this embodiment, as shown in FIG. 8A, the light source lamp always lit in the ordinary reading mode is designed to be lit only for the time of ¼ of the accumulation time of the CCD line sensor 10. That is, in this embodiment, in the subsidiary scanning fine reading mode, the moving speed of the carriage is not changed, and the light source lamp is designed to be lit only for the time of ¼ of the accumulation time of the CCD line sensor 10 by the light source quantity controller 20.

In thus constituted image reading apparatus, the operation is described below while referring to FIG. 9. The operation in the ordinary reading mode is same as in the first embodiment and hence its explanation is omitted.

Figure 9:
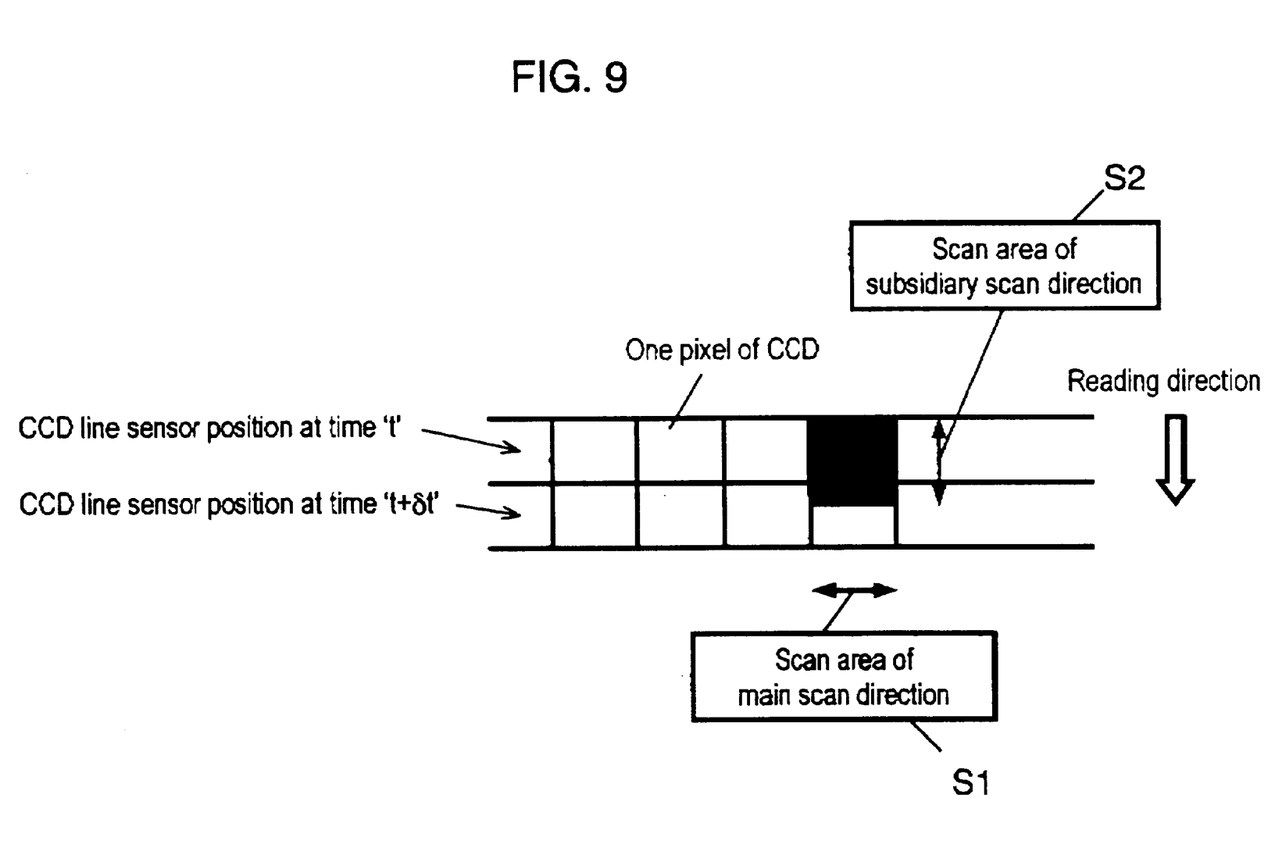
FIG. 9 is an explanatory diagram of reading operation in subsidiary scanning direction.

FIG. 9 shows the reading traces of image reading operation in the image reading apparatus of the embodiment. The reading trace in the main scanning direction corresponds to the width of one pixel of the CCD line sensor 10 as shown in scan area S1 at the main scanning side in FIG. 9, same as in embodiment 1.

The reading trace in the subsidiary scanning direction is the trace of move of the carriage 4 in the period of accumulation time □t as shown in scan area S2 in FIG. 9. When the image is accumulated by the conventional reading method, the image move averaging occurs due to movement of the carriage 4, but in this embodiment, since the lighting time of the light source lamp is only ¼□t, and the output of the CCD line sensor 10 is delivered only once in every four times, the image signal issued from the CCD line sensor 10 is only the portion delivered from the area of ¼ of the scan area, and therefore deterioration of resolution in the subsidiary scanning direction is decreased.

In the embodiment, however, since the lighting time of the light source lamp is shorter, it is predicted that the S/N of the image signal delivered from the CCD line sensor 10 may be lowered. Accordingly, by specifying in the host computer, when it is designed to select either the ordinary reading mode or the subsidiary scanning fine reading mode as shown in FIG. 5, the user can select either the mode for putting emphasis on the S/N, or the mode for putting emphasis on the resolution in the subsidiary scanning direction.

In the example explained above, the lighting time of the power source lamp is ¼, but generally when the lighting time of the power source lamp is 1/n, as the value of n is larger, the resolution in the subsidiary scanning direction is improved. On the other hand, as the value of n is larger, the S/N of the output signal from the CCD line sensor 10 is lowered. In the image reading apparatus of the embodiment, since the user can freely set the value of n, the user can select, depending on the purpose of use, the subsidiary scanning resolution and the S/N of the output signal from the CCD line sensor 10, that is, the gradation of the image.

As is clear from the description herein, by using the image reading apparatus of the embodiment, the user can select the ordinary reading mode and subsidiary scanning fine reading mode, and further when the subsidiary scanning fine reading mode is selected, the subsidiary scanning resolution and image gradation can be selected depending on the purpose of use of the user.

The invention has been described with reference to certain preferred embodiments thereof. It will be understood, however, that modifications and variations are possible within the scope of the appended claims. For example, if a stand alone scanner apparatus is to be employed, the user my input commands directly to the CPU 17 through a user interface. Alternatively, if the scanner is to be coupled to a host computer or host work stations, the user may enter commands through the host computer or host work station.

What is claimed is:

1. A method of processing an image signal comprising:

selecting between an ordinary image reading mode and a fine image reading mode;

illuminating an original document with a light source;

focusing a reflected light or transmitted light from the original document to a photoelectric converter with an optical system;

moving the photoelectric converter relative to the original document in a subsidiary scanning direction;

generating signal data representative of a plurality of image scanning lines with the photoelectric converter, wherein each scan line includes a plurality of pixels;

reading out the signal data from the photoelectric converter and supplying the signal data to an image processing circuit;

wherein the signal data in said fine image reading mode is read out from said photoelectric converter and supplied into said processing circuit every 1/n times (n being an integer of two or more) of the number of times of the signal data is readout in the ordinary image reading mode; and wherein the signal data in said fine image reading mode is read out from said photoelectric converter and supplied into said signal processing circuit every 1/n times of the number of times of the signal data is read out in the ordinary image reading mode when the speed of the relative movement between the photoelectric circuit to the original document is set at 1/n of that of the speed in the ordinary image reading node.

2. An apparatus comprising:

means for selecting between an ordinary image reading mode and a fine image reading mode;

a light source for illuminating an original document;

an optical system for focusing a reflected light or transmitted light from the original document to a photoelectric converter;

means for moving the photoelectric converter relative to the original document in a subsidiary scanning direction;

means for generating signal data representative of a plurality of image scanning lines with the photoelectric converter, wherein each scan line includes a plurality of pixels;

means for reading out the signal data from the photoelectric converter and supplying the signal data to an image processing circuit;

wherein the signal data in said fine image reading mode is read out from said photoelectric converter and supplied into said processing circuit every 1/n times (n being an integer of two or more) of the number of times of the signal data is read out in the ordinary image reading mode; and wherein the signal data in said fine image reading mode is read out from said photoelectric converter and supplied into said signal processing circuit every 1/n times of the number of times of the signal data is read out in the ordinary image reading mode when the speed of the relative movement between the photoelectric circuit to the original document is set at 1/n of that of the speed in the ordinary image reading mode.

* * * * *